United States Patent
Kwak et al.

(10) Patent No.: US 7,802,031 B2
(45) Date of Patent: Sep. 21, 2010

(54) METHOD AND SYSTEM FOR HIGH SPEED NETWORK APPLICATION

(75) Inventors: David T. Kwak, Newport Coast, CA (US); Brian T. Singer, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 254 days.

(21) Appl. No.: 11/132,020

(22) Filed: May 18, 2005

(65) Prior Publication Data

US 2006/0265520 A1    Nov. 23, 2006

(51) Int. Cl.
*G06F 3/00* (2006.01)
*H04L 25/00* (2006.01)

(52) U.S. Cl. .......................... 710/52; 375/372

(58) Field of Classification Search .................. 375/372; 710/22

See application file for complete search history.

(56) References Cited

U.S. PATENT DOCUMENTS

| 4,692,894 A * | 9/1987 | Bemis .......................... 710/57 |
| 6,363,076 B1 * | 3/2002 | Allison et al. ................ 370/419 |
| 6,757,348 B1 * | 6/2004 | Vila et al. .................... 375/372 |
| 6,813,275 B1 * | 11/2004 | Sharma et al. .............. 370/412 |
| 2004/0019729 A1 * | 1/2004 | Kelley et al. ................ 710/306 |
| 2004/0243739 A1 * | 12/2004 | Spencer ........................ 710/22 |

* cited by examiner

*Primary Examiner*—Henry W Tsai
*Assistant Examiner*—Titus Wong
(74) *Attorney, Agent, or Firm*—Klein, O'Neill & Singh, LLP

(57) ABSTRACT

A method and system for a PCI-Express device is provided. The PCI-Express device includes a buffer memory placed in a receive path for receiving an incoming data stream from a Fibre Channel network, wherein the buffer memory is written in a first clock domain and read in a second clock domain using at least two read pointers that are generated by a read pointer logic module, and read pointer values are adjusted based on whether a character is inserted or deleted to avoid buffer memory underflow and/or overflow conditions.

23 Claims, 12 Drawing Sheets

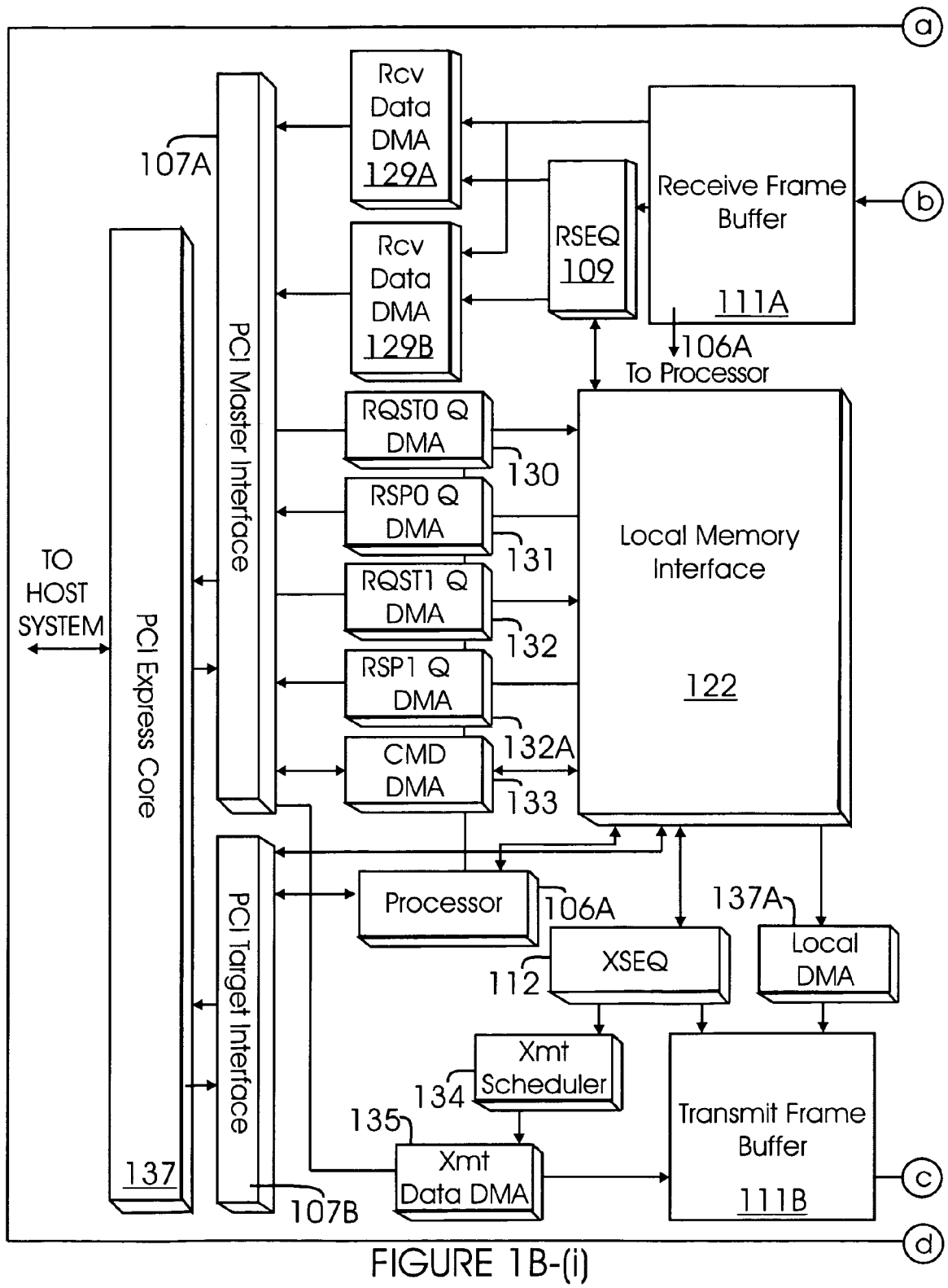
FIGURE 1B-(i)

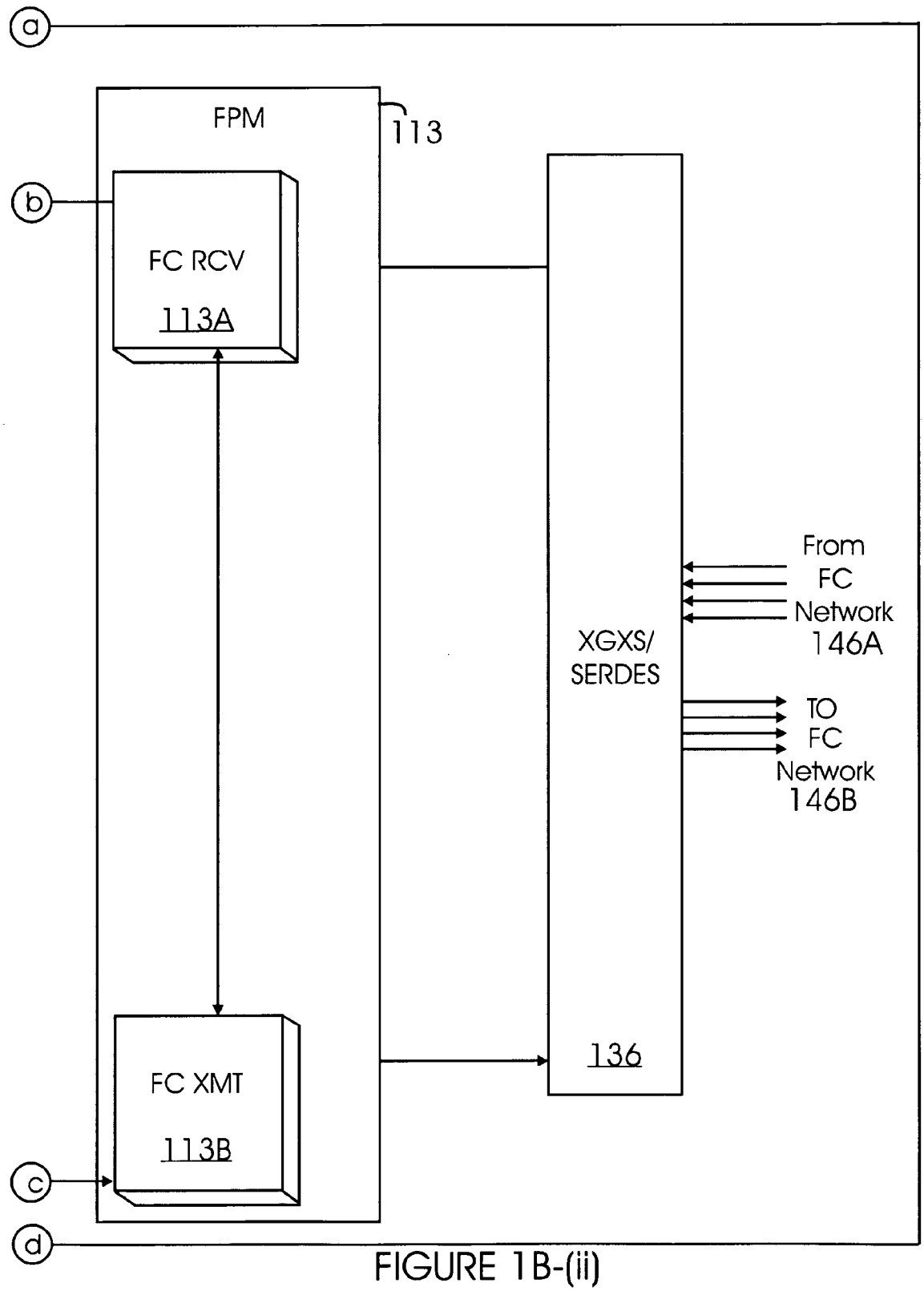
FIGURE 1B-(ii)

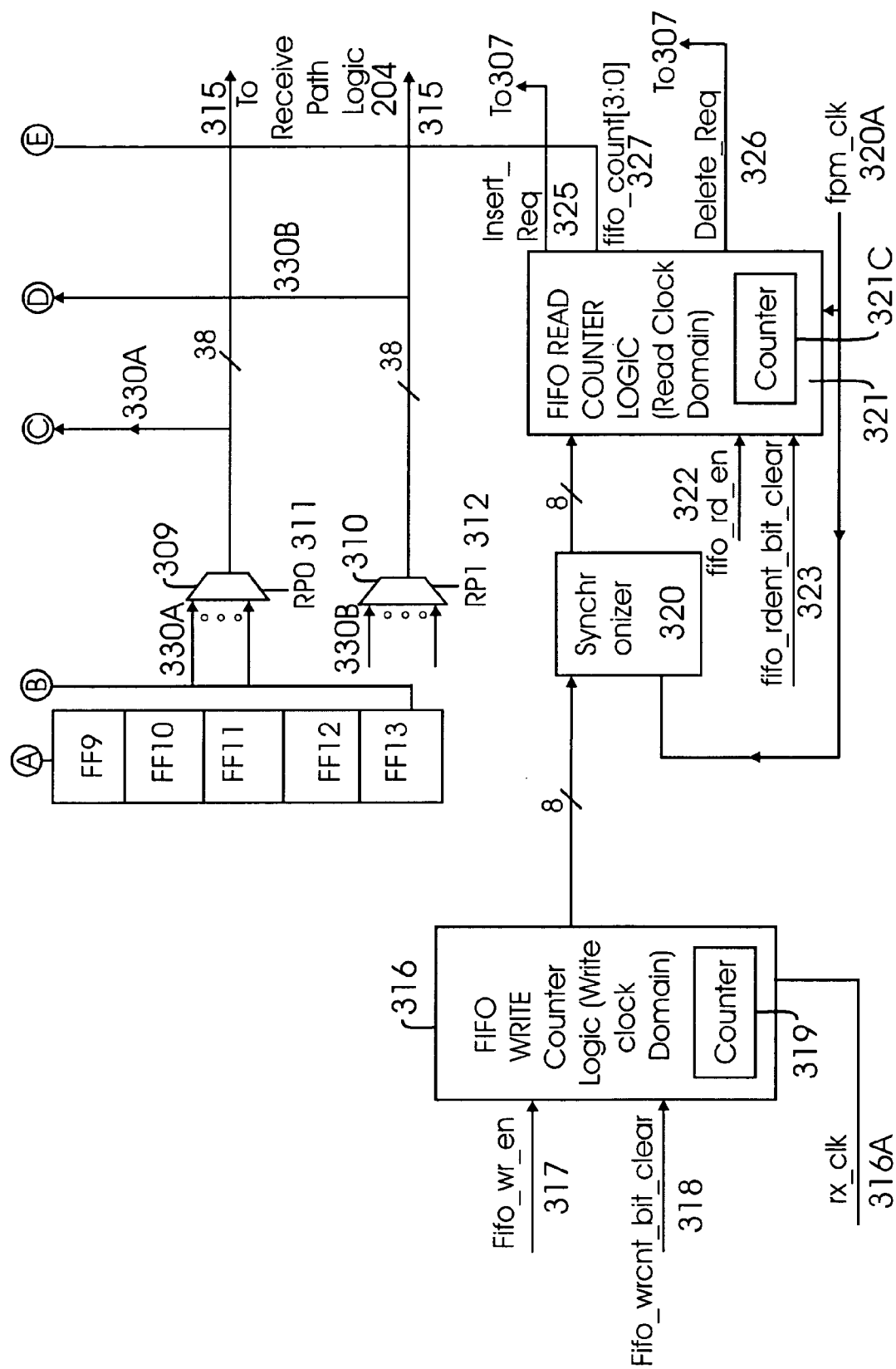
FIGURE 3A(ii)

METHOD AND SYSTEM FOR HIGH SPEED NETWORK APPLICATION

BACKGROUND

1. Field of the Invention

The present invention relates to computing systems, and more particularly, to processing frames at high speeds.

2. Background of the Invention

Computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with peripheral devices via an interface such as the Peripheral Component Interconnect ("PCI") interface, a local bus standard using parallel data transfer that was developed by Intel Corporation®, or the extension of PCI known as PCI-X. More recently, PCI Express, a standard interface incorporating PCI transaction protocols at the logical level, but using serial data transfer at the physical level has been developed to offer better performance than PCI or PCI-X.

Host systems are used in various network applications, including TCP/IP networks, storage area networks ("SANs"), and various types of external device attachment. In SANs, plural storage devices are made available to various host computing systems. Data is typically moved between plural host systems and storage systems (or storage devices, used interchangeably throughout this specification). The connectivity between a host system and networks or external devices is provided by host bus adapters ("HBAs"), which plug into the host system. HBAs may attach to the host system via a standard interface such as PCI/PCI-X or PCI Express.

HBAs receive serial data streams (bit streams), align the serial data and then convert it into parallel data for processing, as described above. HBAs operate as transmitting devices as well as receiving devices.

PCI Express is an Input/Output ("I/O") bus standard (incorporated herein by reference in its entirety) that is compatible with existing PCI cards using the PCI Express bus. PCI Express uses discrete logical layers to process inbound and outbound information.

Various other standard interfaces are also used to move data between host systems and peripheral devices. Fibre Channel is one such standard. Fibre Channel (incorporated herein by reference in its entirety) is an American National Standard Institute (ANSI) set of standards, which provides a serial transmission protocol for storage and network protocols.

Networks in general and SANs in particular are now expected to operate at high speeds, for example, at a rate greater than 4 Gigabits per second ("GB") (for example, 10 GB). HBAs often use an elasticity receive first in first out ("FIFO") buffer memory to stage incoming frames from the Fibre Channel network. When frames enter an HBA at high speeds, it is difficult to insert or delete fill words to avoid overflow or underflow conditions. Fill words are standard characters (for example, "IDLE") that are included in a data stream.

If the rate at which frames enter the FIFO is higher than the rate at which the FIFO is read, then the FIFO can over flow (or overrun). If the rate at which the FIFO is filled is lower than the rate at which the FIFO is being read, then the FIFO can be under run (or under flow).

HBAs operating at high speeds may have to widen the local bus, for example, for a HBA supporting a 10 GB link may have to use a 64-bit bus. A serial/de-serializer ("SERDES") is used to extract a receive clock (Rx_Clk) from incoming frames (i.e. frames that enter the HBA). Data is read from the FIFO at a different clock (may be called a system clock and is also referred to as FPM Clock) than the Rx_CLK. Although a 64-bit data stream enters the HBA, 32-bit patterns are processed by most HBA components. The clock difference coupled with the difference between the 64-bit and 32-bit pattern, makes it difficult to insert/delete fill words to avoid overflow and under flow conditions in high data throughput environments (for example, a network using a 10 GB link).

Conventional FIFO schemes fail to solve the over flow/under flow conditions and hence fail to meet the demands imposed by high operational speeds (for example, a speed of 10 GB).

Therefore, there is a need for a method and system in a HBA that can operate with frequency mismatch conditions of a wider bus and also operate efficiently so that it does not over flow/under flow.

SUMMARY OF THE INVENTION

In one aspect, a PCI-Express device is provided. The PCI-Express device includes a buffer memory placed in a receive path for receiving an incoming data stream from a Fibre Channel network, wherein the buffer memory is written in a first clock domain and read in a second clock domain using at least two read pointers that are generated by a read pointer logic module, and read pointer values are adjusted based on whether a character is inserted or deleted to avoid buffer memory underflow and/or overflow conditions.

A buffer memory read count module monitors the buffer memory to ascertain whether an underflow or overflow condition will occur in the buffer memory while the incoming data stream is being written and read from the buffer memory. The buffer memory read count module sends a buffer memory status count signal to the read pointer logic indicating a current status for the buffer memory.

Based on the status count the buffer memory read count module sends a delete and/or insert request to the read pointer logic for deleting a character in the incoming data stream. The read pointer logic adjusts the read pointer values so that an insertable/deletable character is inserted/skipped while buffer memory is being read.

In yet another aspect of the present invention, the PCI-Express device is a HBA used in a SAN.

In yet another aspect, a method for processing an incoming data ream from a Fibre Channel network is provided. The method includes, receiving an incoming data stream in a buffer memory; wherein the buffer memory is located in a receive path of a HBA; reading at least two words simultaneously from the buffer memory based on two read pointer values; wherein a read pointer logic generates the read pointer values to read data words from the buffer memory; analyzing a next word while a current word is being read to comply with a delete request that is received from a read count module; analyzing a current word to comply with an insert request from the read pointer logic; and adjusting read pointer values so that a character is skipped to comply with the delete request; and adjusting read pointer values so that a character is read more than once to comply with the insert request.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1B is a block diagram of a host bus adapter used according to one aspect of the present invention;

DETAILED DESCRIPTION OF THE PREFERRED EMBODIMENTS

To facilitate an understanding of the preferred embodiment, the general architecture and operation of a SAN, and a HBA will be described. The specific architecture and operation of the preferred embodiment will then be described with reference to the general architecture of the SAN and HBA.

Figure 1A:
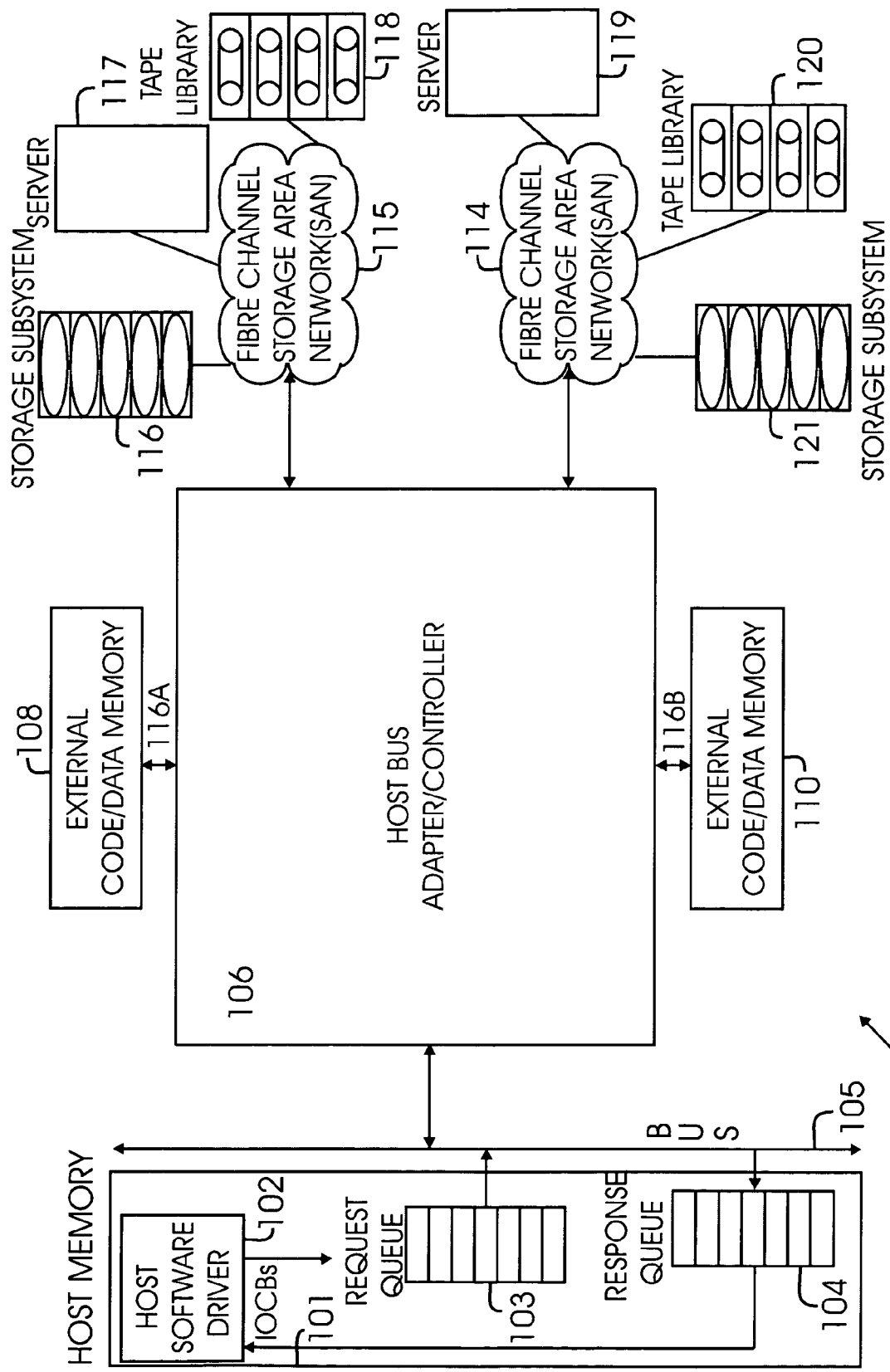
FIG. 1A is a block diagram showing various components of a SAN.

SAN Overview:

FIG. 1A shows a SAN system 100 that uses a HBA 106 (a PCI-Express device) (referred to as "adapter 106") for communication between a host system with host memory 101 to various storage systems (for example, storage subsystem 116 and 121, tape library 118 and 120) using Fibre Channel storage area networks 114 and 115. Servers 117 and 119 can also access the storage sub-systems (for example, 116 and 121) using SAN 115 and 114, respectively.

Host memory 101 includes a driver 102 that coordinates all data transfer via adapter 106 using input/output control blocks ("IOCBs").

A request queue 103 and response queue 104 is maintained in host memory 101 for transferring information using adapter 106. Host system communicates with adapter 106 via bus 105 (PCI/PCI-X or PCI-Express).

HBA 106:

FIG. 1B shows a block diagram of adapter 106. Adapter 106 includes processors (may also be referred to as "sequencers") "RSEQ" 109 and "XSEQ" 112 for receive and transmit side, respectively for processing data received from storage sub-systems and transmitting data to storage sub-systems. Transmit path in this context means data path from host memory 101 to the storage systems via adapter 106. Receive path means data path from storage subsystem via adapter 106. It is noteworthy, that only one processor is used for receive and transmit paths, and the present invention is not limited to any particular number/type of processors. Buffers 111A and 111B are used to store information in receive and transmit paths, respectively.

Beside dedicated processors on the receive and transmit path, adapter 106 also includes processor 106A, which may be a reduced instruction set computer ("RISC") for performing various functions in adapter 106.

Adapter 106 also includes Fibre Channel interface (also referred to as Fibre Channel protocol manager "FPM") 113 that includes modules 113A and 113B in receive and transmit paths, respectively (shown as "FC RCV" and "FC XMT"). Modules 113A and 113B allow data to move to/from storage systems and are described below in detail. Frames 146A are received from a Fibre Channel network, while frames 146B are transmitted to the Fibre Channel network.

Adapter 106 is also coupled to external memory 108 and 110 via connection 116A/116B (FIG. 1A) (referred interchangeably, hereinafter) and local memory interface 122. Memory interface 122 is provided for managing local memory 108 and 110. Local DMA module 137A is used for gaining access to a channel to move data from local memory (108/110). Adapter 106 also includes a serial/de-serializer (shown as "XGXS/SERDES") 136 for converting data from 10-bit to 8-bit format and vice-versa, and is described below in detail.

Adapter 106 also includes request queue DMA channel (0) 130, response queue (0) DMA channel 131, response queue (1) 132A, and request queue (1) DMA channel 132 that interface with request queue 103 and response queue 104; and a command DMA channel 133 for managing command information. DMA channels are coupled to an arbiter module (not shown) that receives requests and grants access to a certain channel.

Both receive and transmit paths have DMA modules "RCV DATA DMA" 129A and 129B and "XMT DATA DMA" 135 that are used to gain access to a channel for data transfer in the receive/transmit paths. Transmit path also has a scheduler 134 that is coupled to processor 112 and schedules transmit operations.

A host processor (not shown) sets up shared data structures in buffer memory 108. A host command is stored in buffer 108 and the appropriate sequencer (i.e., 109 or 112) is initialized to execute the command.

PCI Express (or PCI) master interface 107A and PCI target interface 107B are both coupled to a PCI-Express Core (or PCI core) logic 137 (may also be referred to as "logic 137"). Logic 137 is coupled to a host system. Interface 107A and 107B includes an arbitration module that processes DMA access to plural DMA channels.

Figure 2A:
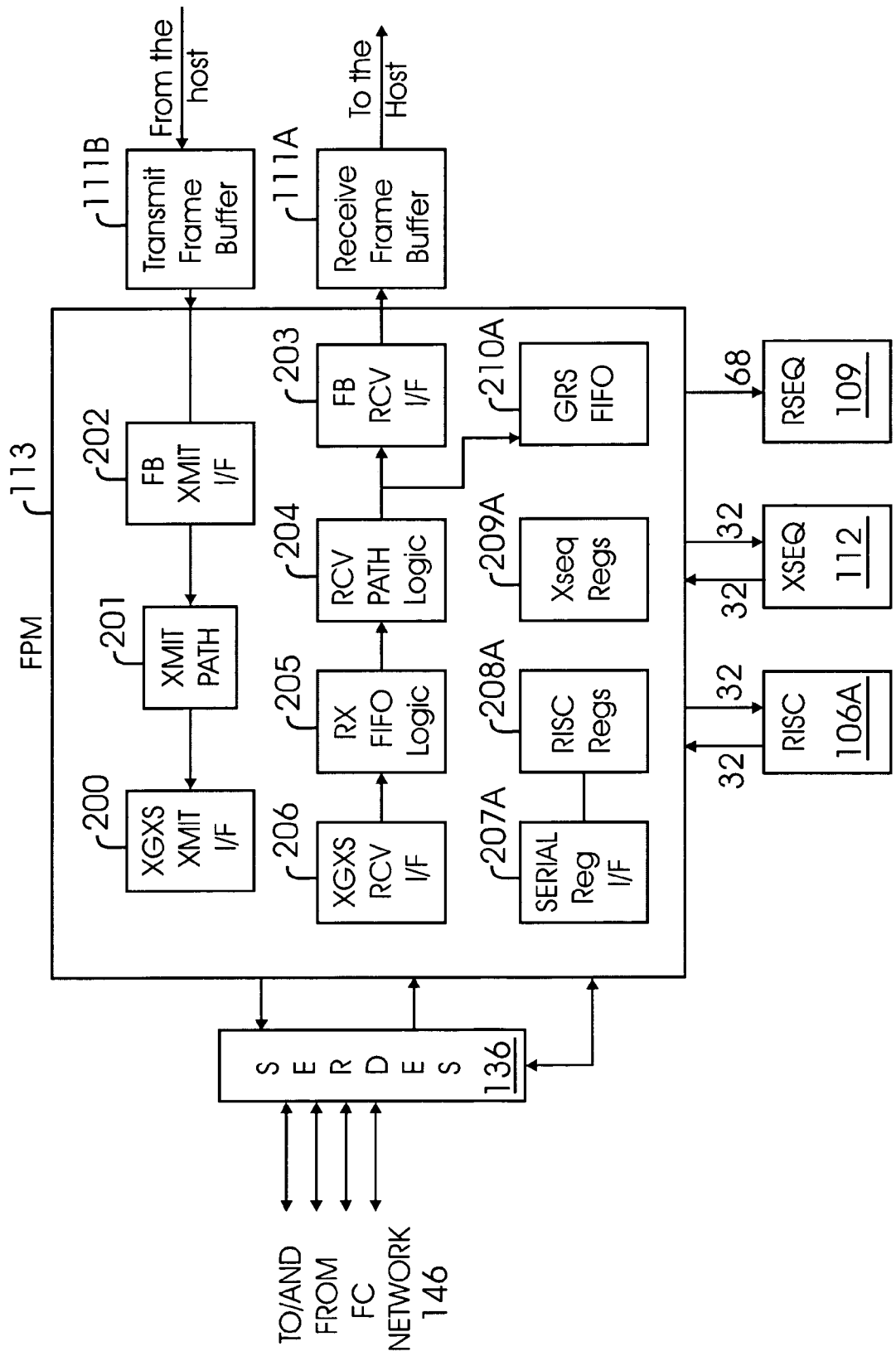
FIG. 2A shows a block diagram of a FPM module, according to one aspect of the present invention.

FPM 113:

FIG. 2A provides a block diagram showing various modules that are used in the receive and transmit paths in FPM 113. Four lanes (shown as 146 in FIG. 2A) may be used to receive/transmit frames from the fibre channel network. On the receive side, interface 206 (shown as "XGXS RCV I/F") receives frames from SERDES 136 and the frames are sent to receive first-in-first-out logic "Rx FIFO" 205 that is described below in detail. Logic 205 sends frames to receive path logic (shown as "RCV Path Logic") 204 and then to frame buffer 111A via interface (shown as "FB RCV I/F") 203.

The transmit path receives frames from buffer 111B and then through interface (shown as "FB XMIT I/F") 202, transmit path logic 201 (shown as XMIT PATH) and interface ("XGXS XMIT I/F") 200 frames are encoded by module 136 and then to the network.

FPM 113 also includes various registers, for example, a serial register interface 207A that interfaces with SERDES 136, register 208A that is used by processor 106A, and register 209A that is used by XSEQ 112. GRS FIFO 210A stores information from incoming frames 146A and is used by RSEQ 109.

Figure 3A:
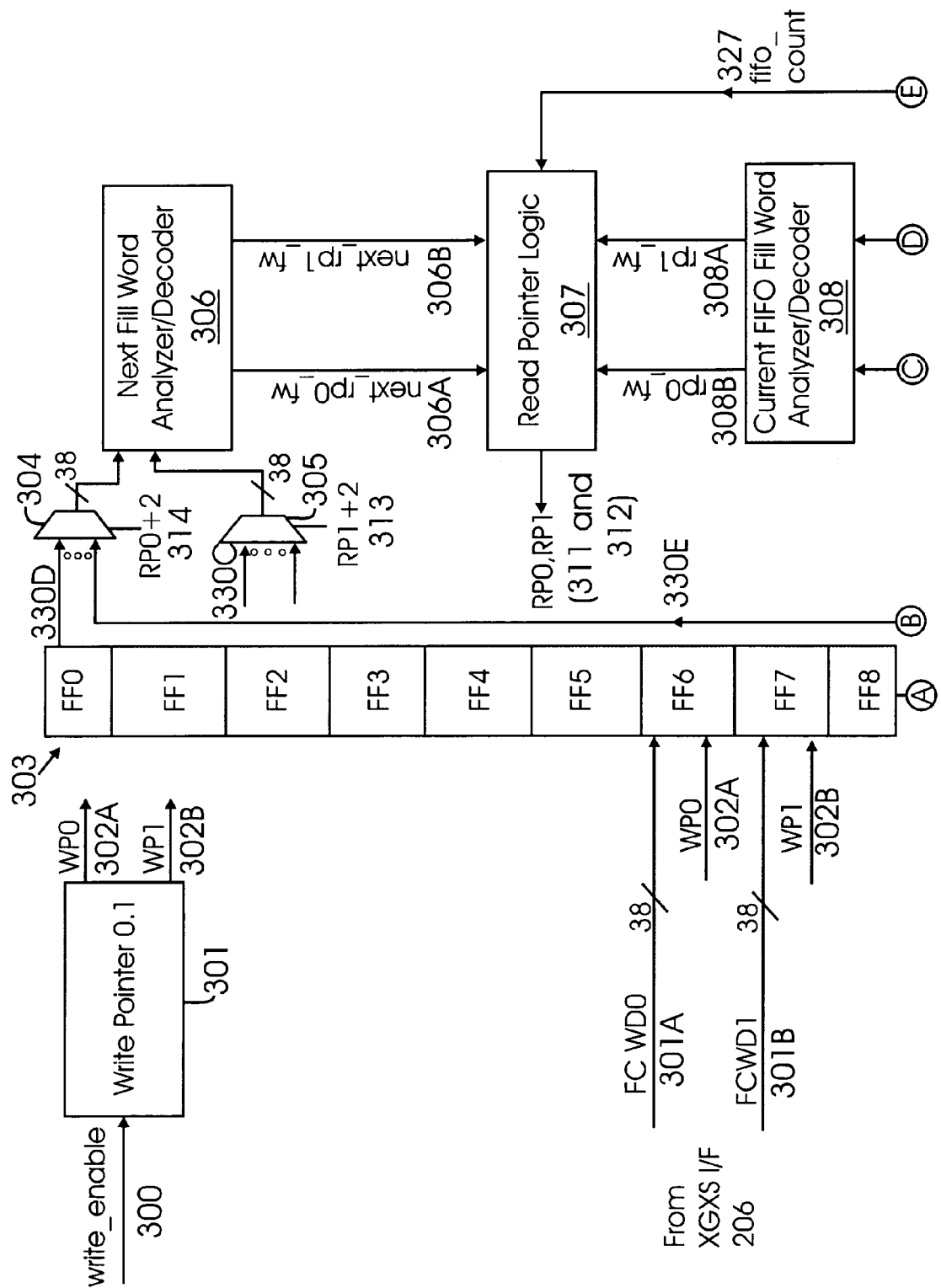
FIG. 3A shows a block diagram of an elastic buffer module in the FPM module of FIG. 2A, according to one aspect of the present invention.

Rx FIFO LOGIC:

FIG. 3A shows a block diagram of Receive FIFO logic 205 that operates under two different clocks, Rx_CLK 316A and FPM_CLK (system clock) 320A. Data received by Rx FIFO logic 205 is sent to RCV path logic 204, and then to frame buffer 111A via interface 203.

Figure 2B:
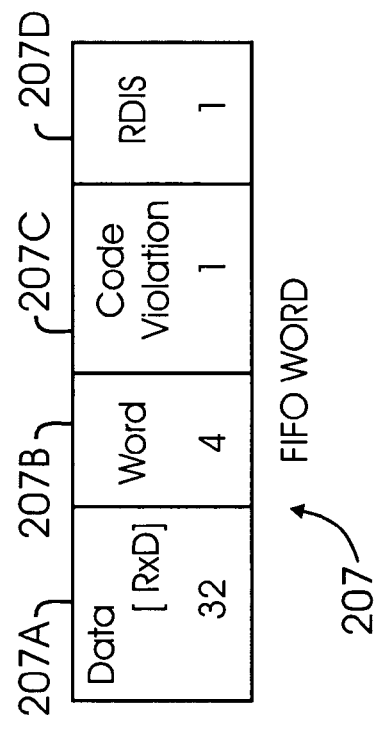
FIG. 2B shows the structure of the incoming data packet.

FIG. 2B shows the structure of a Fibre Channel data or control packet (may also be referred to as "frame data packet" or "data packet") 207. A frame data packet 207 has 32 bits of data (shown as RXD 207A [31:0]), a control bit 207B (shown as RXC [35:32] (i.e. 4 bits), Code violation (CV) bits 207C [36] (i.e., 1 Bit) and running disparity error bits ("RDIS") 207D [37] (i.e. 1 bit).

Turning in detail to FIG. 3A, frames (or data words) WD0 301A and WD1 301B are received from XGXS RCV Interface 206. The data words (32-bits) are written in an individual slot of a buffer memory 303. Buffer memory 303 includes plural slots, shown as FF0 to FF13. Two data words are written simultaneously at two slots based on the two write pointers (shown as WP0 302A AND WP1 302B).

The write pointers are generated by write pointer logic 301, which is enabled by a write_enable signal 300 received from XGXS RCV interface 206. FIG. 3A shows two write pointers, designated as WP0 302A and WP1 302B that provide a buffer memory 303 slot address where data words are written. For example, as shown in FIG. 3A, WP0 302A is used to write to slot FF6 and WP1 302B is used to write to slot FF7. Based on the write pointers, two data words (or frame packets, used interchangeably) are continuously loaded in buffer memory 303 slots. Each write pointer advances by 2 on each RX_CLK 316A when the write operation is enabled.

After data is written, at least two data words are simultaneously read from buffer memory 303 by using two read pointers designated as RP0 (311) and RP1 (312). The read pointers provide the address of the memory slots from where data is read at a given time. For example, RP0 311 can be used to read from slot FF0 and RP1 312 to read from slot FF1. The read pointers 311 and 312 operate independent of each other and simultaneously read two data words.

Under normal operation, pointers RP0 311 and RP1 312 are incremented (increased) by 2, which allow the system to read two words at a time. Hence, when RP0 is increased by 2 after slot FF0 is read, the slot FF2 is read by RP0+2 and slot FF3 is read based on pointer RP1+2. If an IDLE primitive is inserted or deleted, then a different number is used to increase the read pointer values, as described below.

Read pointer logic 307 generates the read pointers RP0 and RP1 (shown as 311 and 312). Based on pointer RP0 311, data 330A is unloaded from a buffer memory 303 slot and then sent (shown as 315) to receive path logic 204 via multiplexer 309. Based on pointer RP1 312, data 330B is unloaded and sent to receive path logic 204 via a multiplexer 310. This process continues until all the slots are read (shown as 330D and 330E).

Receive FIFO logic 205 includes a next fill word analyzer/decoder logic 306 (also referred to as "logic 306") that analyzes a next data word at given time, to determine whether the next data word includes a character/primitive that can be deleted/skipped, if a delete request is pending. For example, when data word 330D from slot FF0 is being read based on pointer RP0, then logic 306, analyzes the next word that will be based on pointer RP0+2, shown as 314 (via multiplexer 304) to determine if a deletable fill word, for example, an IDLE primitive, is present to comply with a delete request. Throughout this specification, where an IDLE primitive/character is referenced, it is intended to illustrate a fill word and is not to be construed as a limitation to the adaptive aspects of the present invention. Details regarding how the delete request is generated are provided below.

Since two pointers are used to read data, logic 306 also analyzes data words for deletion based on pointer RP1. For example, data word 330C is sent to logic 306 based on pointer RP1+2 (shown as 313), when the data word based on RP1 is being read. This process continues until the last slot is read (shown as 330E).

Logic 306 sends signals 306A and 306B to read pointer logic 307. Signals 306A and 306B indicate to read pointer logic 307 whether the next data words could be skipped to comply with a delete request.

Receive FIFO logic 204 also analyzes a current word that is being read by using current fill word analyzer/decoder logic 308 (referred to as logic 308). The current word is analyzed to determine if an insertable character (for example, the IDLE primitive) is present and can be used to comply with an insert request. Details regarding how the insert requests are generated are provided below.

As shown in FIG. 3A, data words 330A and 330B are analyzed by logic 308 to determine if a current word is an insertable character (for example, the IDLE primitive). Logic 308 sends signal/commands 308A and 308B to read pointer logic 307 indicating whether a current word can be used to fulfill an insert request. This allows read pointer logic 307 to modify read pointer values so that an insert request can be fulfilled.

In order to avoid overflow and under flow conditions, buffer memory 303 status (i.e. to determine how full or empty) is monitored by a FIFO write counter logic 316 (may also be referred to as logic 316) and a FIFO read counter logic 321 (referred to as logic 321). A status signal 327 is sent to read pointer logic 307 indicating a current status of buffer memory 303. If the buffer memory 303 capacity at a given time is greater or less than a threshold value, then an insert request 325 or a delete request 326 is sent to read pointer logic 307. The threshold value can be hard wired or programmed by HBA 106 firmware.

Based on the type of request (insert or delete) and inputs 306A/306B from logic 306 and inputs 308A/308B from logic 308, read pointer logic 307 increments the read pointer value by a number such that the read/write process is performed efficiently, while maintaining the threshold capacity for buffer memory 303.

Logic 316 includes a counter 319; for example, an 8-bit counter that counts each data word that is written in buffer memory 303. Synchronizer 320 synchronizes the write clock domain values from RX_CLK 316A to FPM_CLK 320A.

Counter 319 is enabled by signal 317 and cleared by signal 318. Counter 319 is cleared when a bit value in logic 316 is cleared asynchronously with respect to a read FIFO count bit in logic 321 that is set in the read clock domain (FPM_CLK 320A).

Logic 321 operates in the read clock domain (FPM_CLK 320A). Logic 321 includes a counter 321C that counts the number of data words that are read from buffer memory 303. Counter 321C is enabled by signal 322 and cleared by signal 323. A FIFO count bit, as described below, is cleared in the read clock domain when a FIFO data word is read.

Logic 321 counts the data words that are written in buffer memory 303 and generates a FIFO count signal/command 327, which is sent to read pointer logic 307. Signal 327 indicates the status of buffer memory 303 to read pointer logic 307. Based on the status of signal 327, logic 321 generates an insert request signal 325 and/or a delete request signal 326.

Figure 5A:
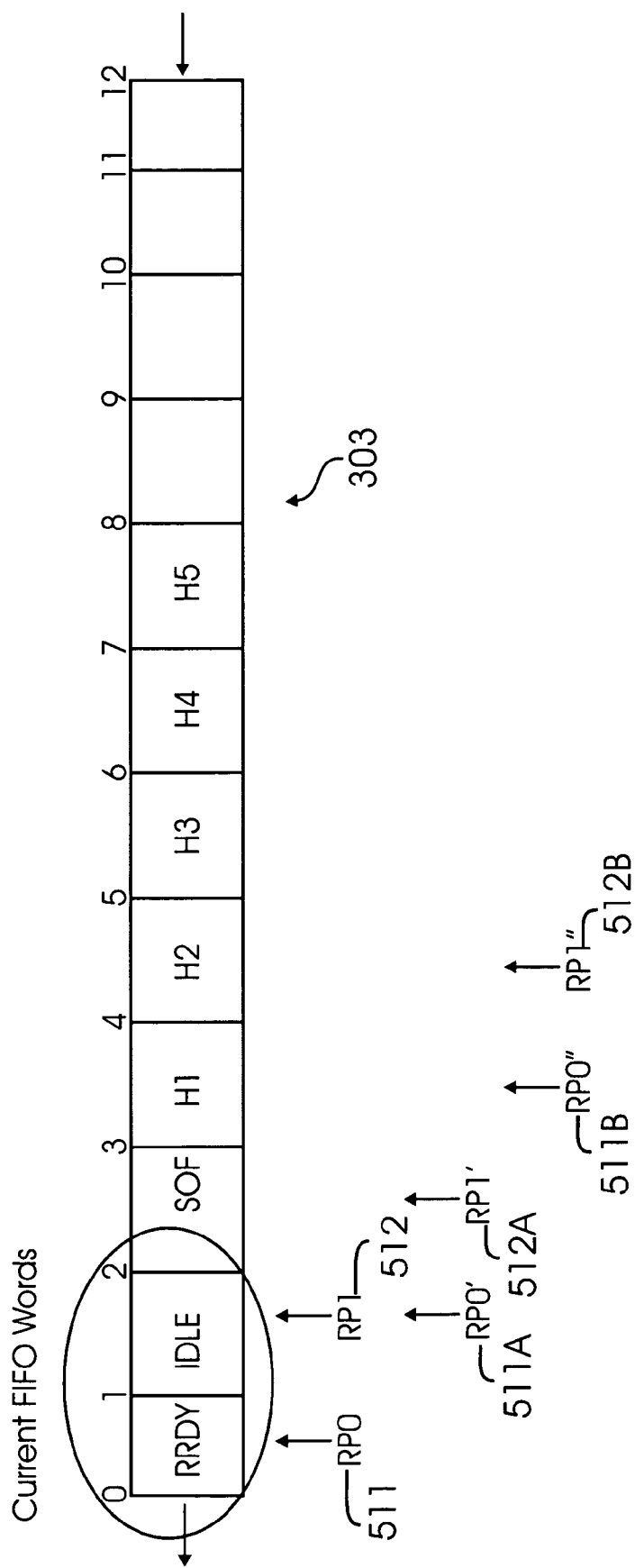
FIGS. 5A and 5B show an example of fill word insertion, according to one aspect of the present invention.
Figure 5B:
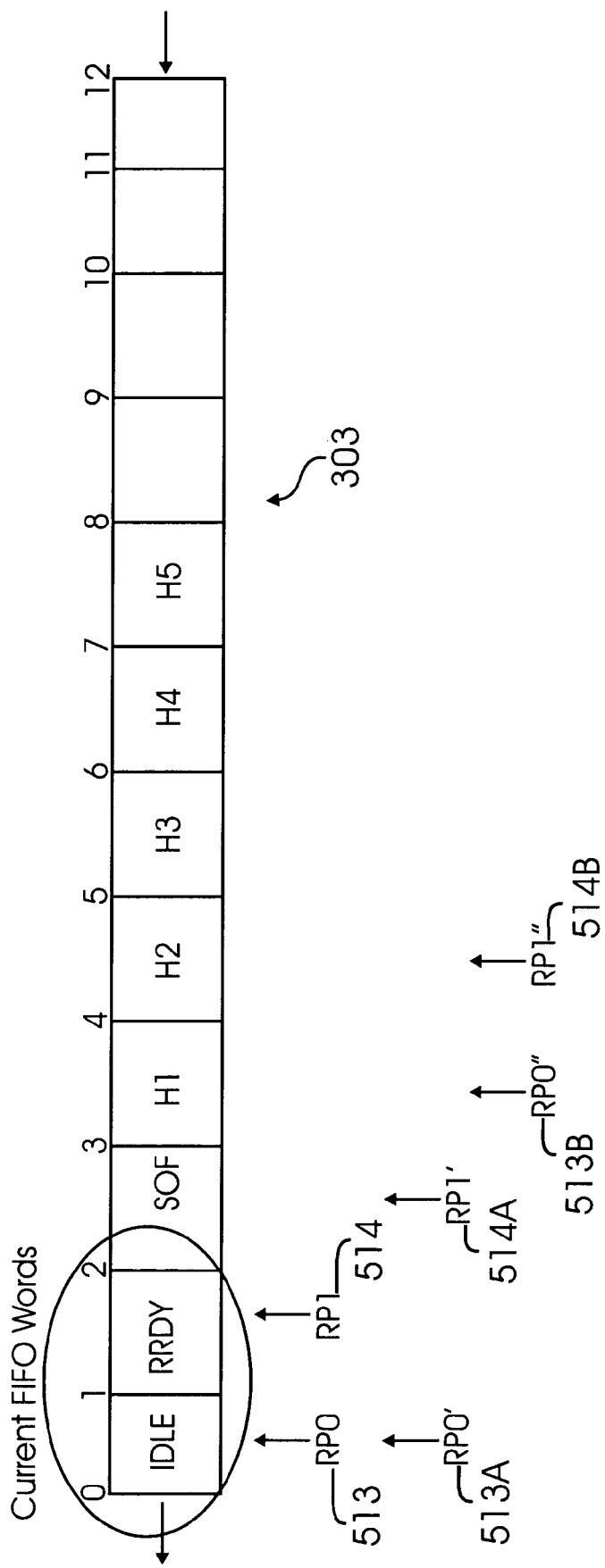

Signal 325 instructs the read pointer logic 307 to increment the read pointers to accommodate an insert operation. An example of how pointer values are changed for an insert operation is shown in FIGS. 5A and 5B and discussed below in detail.

Signal 326 instructs the read pointer logic 307 to increment the read pointer values to accommodate a delete operation. An example of how pointer values are changed for a delete operation is shown in FIGS. 4A and 4B and discussed below in detail.

Figure 3B:
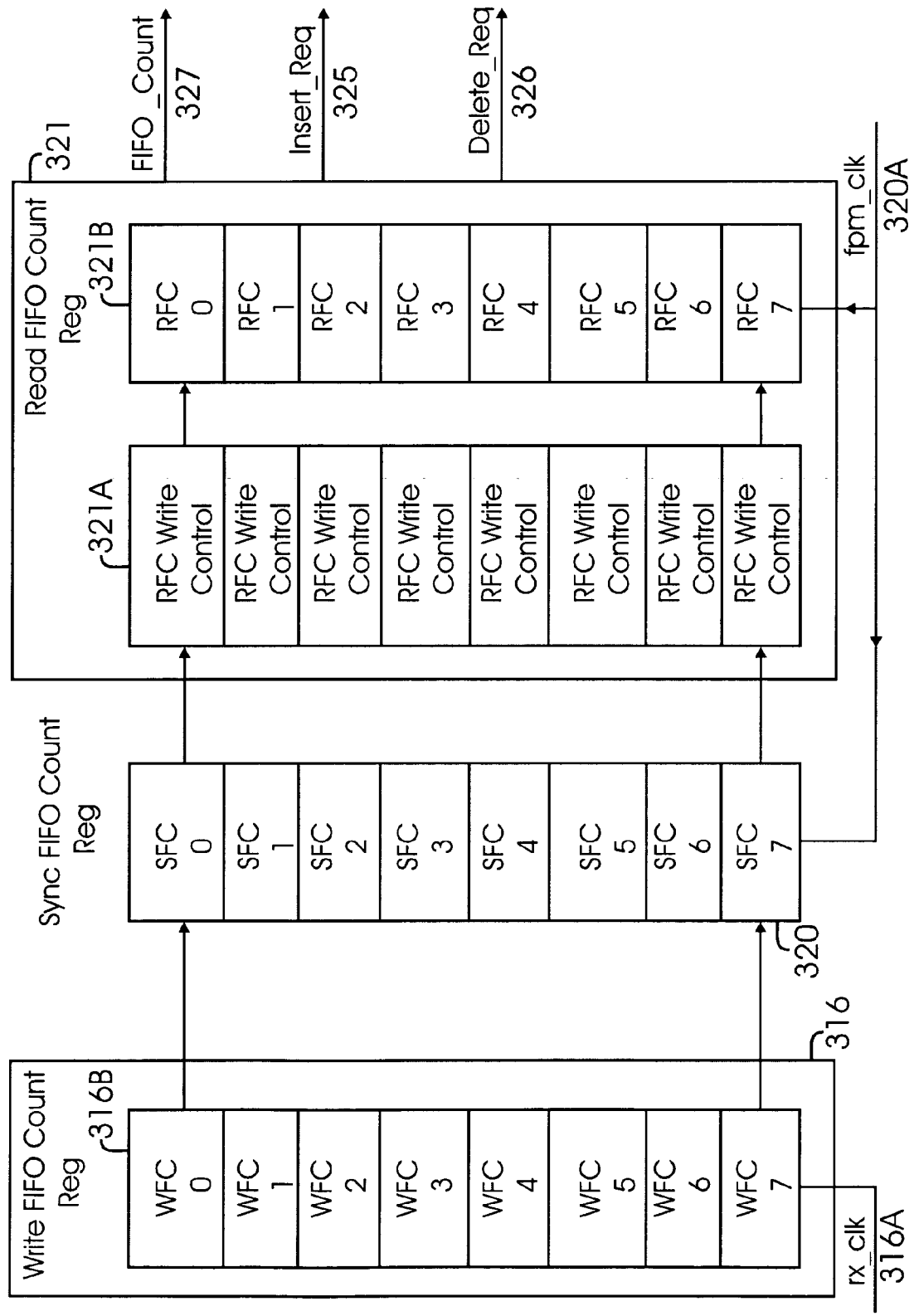
FIG. 3B shows a block diagram of the elastic buffer module for reorganizing incoming data, according to one aspect of the present invention.

FIG. 3B shows details of logic 316, 320 and 321. Logic 316 includes a write FIFO count register 316B. Register 316B bits for example, WFC[n] is set when the write pointer (for example, WP0) is equal to n and FIFO write operation is enabled (300). When a register slot (for example, WFC0) is set, synchronizer 320 synchronizes the bit value to FPM_CLK 320A.

Logic 321 includes a register 321B, which is controlled by a control register 321A. Control register 321A sets the bits in register 321B when it receives the synchronized bit value from synchronizer 320. Register 321B entries are cleared when a data word is read. Register 316B bits are cleared asynchronously to FPM_CLK 320A by using register 321B bits.

Figure 4A:
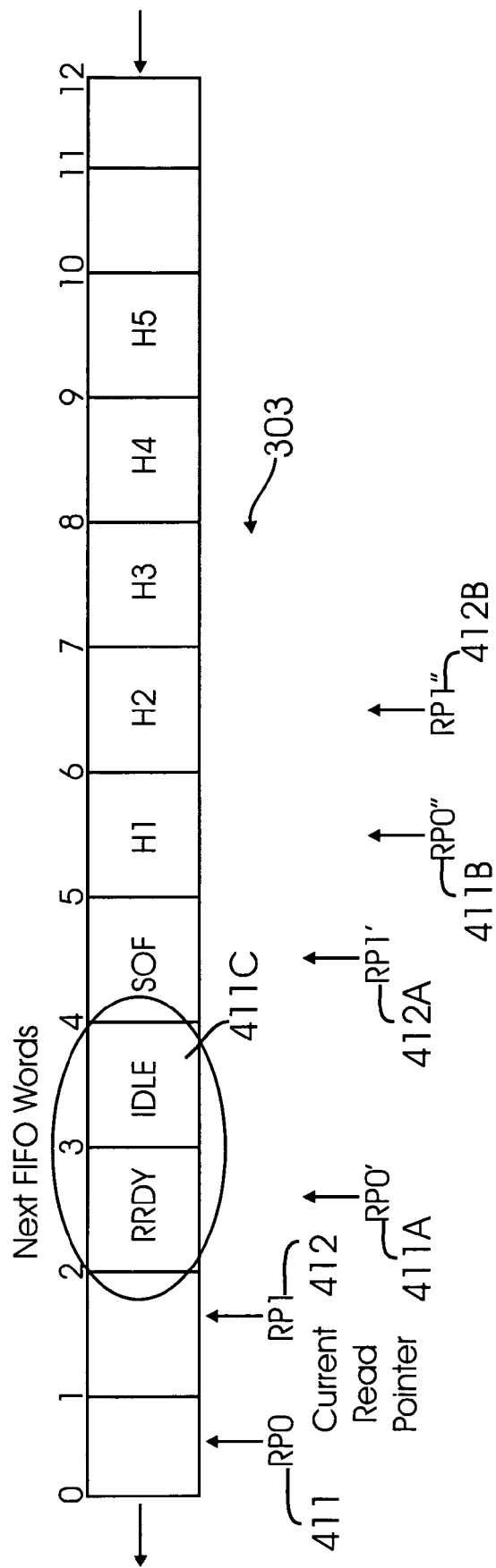
FIGS. 4A and 4B show an example of deleting fill words, according to one aspect of the present invention.
Figure 4B:
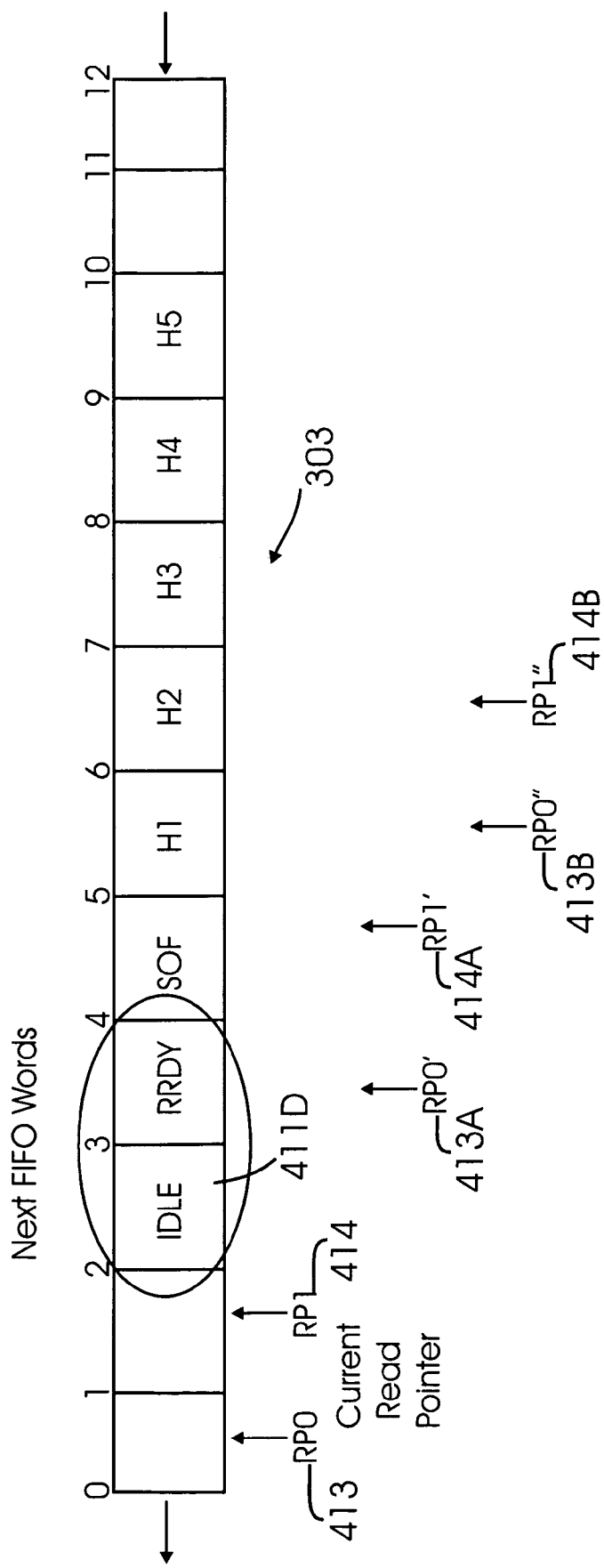

FIGS. 4A and 4B show how deletable characters (for example, IDLE primitives (may also be referred to as characters throughout this specification)) are deleted (or skipped) to maintain optimum buffer memory 303 conditions. This is achieved by manipulating read pointer values so that a deletable character is not read from buffer memory 303.

Throughout FIGS. 4A and 4B (also, FIGS. 5A and 5B), read pointers have been shown as RP0, RP0' and RP0". All events for RP0 happen in one clock cycle, RP0' events happen after the RP0 clock cycle and RP0" events occur after RP0' clock cycle. The same also applies to events based on pointers, RP1, RP1' and RP1".

FIG. 4A shows an example, of a case, when a delete request is pending and a character is to be deleted (shown as an IDLE character 411C) on a next read pointer (shown as RP1' 412A). Read pointers RP0 (411) and RP1 (412) read a current data word (two data words are read by using the two pointers). In a standard operation (i.e. without a delete operation), each read pointer advances by two.

However, in this case, the next set of pointers, i.e., RP0' 411A points to primitive R_RDY, while RP1' points to slot 5, so that the IDLE character (411C) is skipped. In this case, read pointer 412 is incremented by 3 to generate RP1'. Hence, after slot 3 is read based on RP0', slot 5 is read based on RP1'.

The pointer values to accommodate the delete operation are shown as below:

RP0 (411) is the pointer for reading a current word (for example from slot 0, at a given time).

RP1 (412) is the pointer used for reading slot 1.

RP0 is incremented by 2 (RP0'=RP0+2) and is shown as RP0' 411A to read the R_RDY primitive from slot 2.

RP1 is incremented by 3 to generate RP1' (412A) so that slot 3 with the IDLE primitive is skipped.

Pointer RP0' (411A) is increased by 3 to generate pointer RP0" (shown as 411B) to read slot 5, after the IDLE character is skipped. Thereafter, RP1' is increased by 2 to read slot 6, as shown by pointer RP1" (412B).

FIG. 4B shows an example for deleting an IDLE character that is based on read pointer RP0 (for example, the IDLE primitive 411D in slot 2, instead of the IDLE primitive 411C (FIG. 4A) in slot 3, as discussed above). In this case, RP0 (shown as 413) is increased by 3 to skip the IDLE primitive located in slot 2. The next RP0 pointer, shown as RP0' 413A is equal to RP0+3. The next RP1 pointer (shown as RP1' 414A) is equal to RP1+3. The next pointers, RP0" 413B and RP1" 414B, are based on increasing RP0' and RP1' by 2, i.e., normal operation without a delete step.

FIGS. 5A and 5B shows how read pointer values are manipulated to accommodate an insert operation, according to one aspect of the present invention.

FIG. 5A shows an example, of inserting an insertable character (for example, an IDLE character) when an insert request is pending and the first character that can be duplicated (or inserted) is located by the RP1 pointer. The IDLE primitive is located in slot 1 and is read by pointer RP1 (shown as 512). Read pointer RP0 (shown as 511) reads from slot 0, which is a R_RDY primitive.

In order to insert another IDLE primitive, RP0 and RP1 are increased by 1, instead of 2 under normal conditions (i.e. without a pending insert request). This ensures that the IDLE character in slot 1 is read twice, once by pointer RP1 512 and then by pointer RP0' 511A. Hence by reading the same character twice, an extra IDLE primitive is inserted.

The pointer values are shown as follows:

$RP0'$ (shown as 511A)=$RP0+1$ $RP1'$ (shown as 512A)=$RP1+1$

The subsequent pointers, for example, RP0" (511B) and RP1" (512B) are based on increasing RP0' (511A) and RP1' (512A) by 2, respectively.

FIG. 5B shows an example of inserting an IDLE primitive, where the first IDLE primitive is on pointer RP0. The IDLE character in this case is in slot 0, read by pointer RP0 513. In this case, the next RP0 pointer value (shown as RP0' 513A) is equal to RP0 (513). This ensures that the IDLE character is read twice from slot 0 using RP'. The RP1 (514) pointer value is increased by 1 to generate RP1' (shown as 514A) to read from slot 2. The next RP0 pointer value, shown as RP0" (513A) is based on increasing RP0' (513A) by 3 to read from slot 3. The next RP1 pointer, shown as RP1" 514B is based on increasing RP1' (514A) by 2. Thereafter, the pointer values are increased by 2, unless an insert request is detected and pending.

Figure 6:
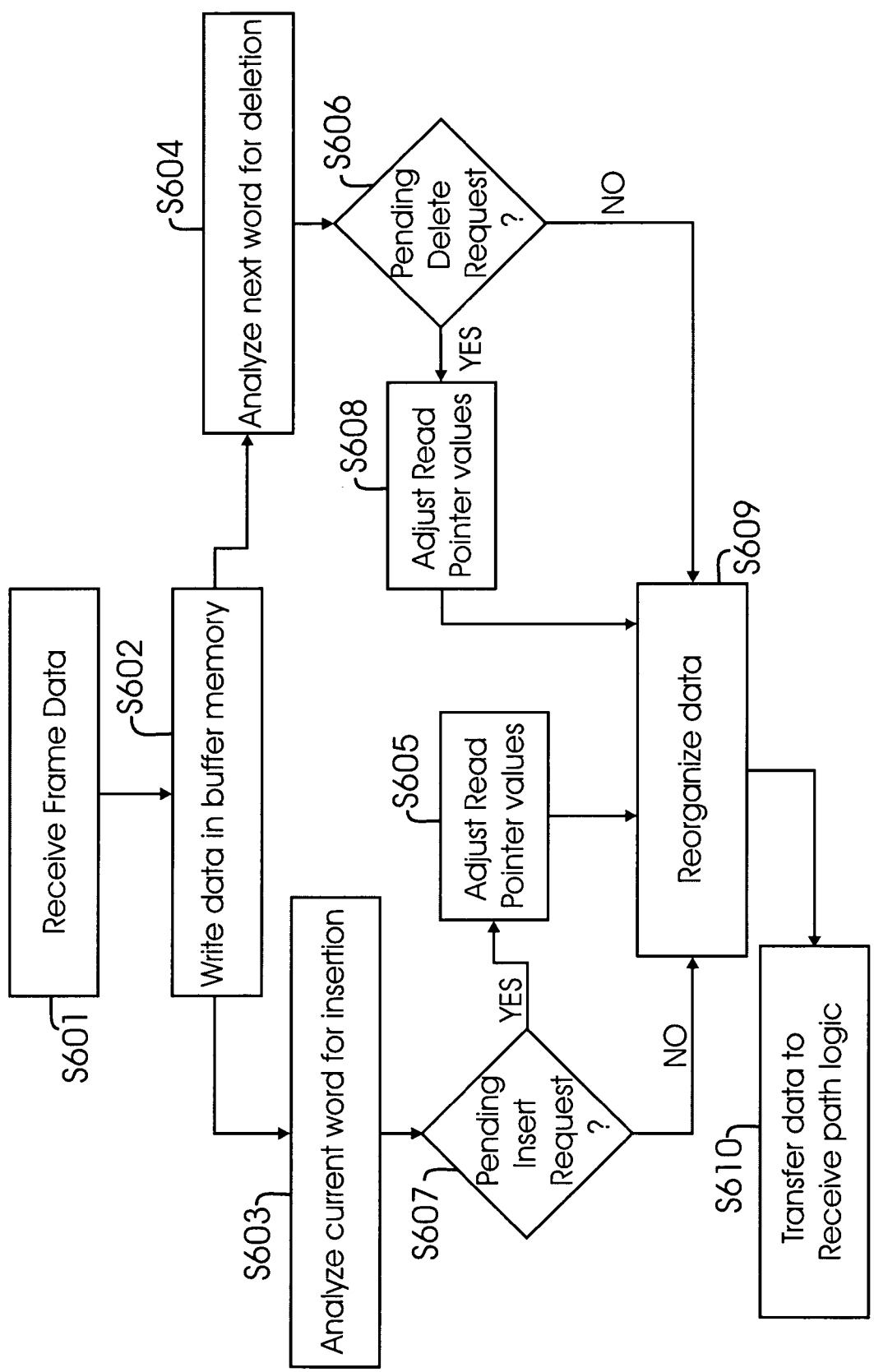
FIG. 6 shows a process flow diagram for inserting and deleting fill words, according to one aspect of the present invention.

FIG. 6 shows a process flow diagram for processing frames by inserting and/or deleting insertable/deletable characters by manipulating read pointer values, according to one aspect of the present invention. Turning in detail to FIG. 6, in step S601, frames are received from interface 206. In step S602, incoming frames are written as two data words in buffer memory 303.

In step S603, logic 308 analyzes a current frame word for insertion, while in step S607, the process determines if an insert request is pending. Steps S603 and S607 may occur simultaneously. If a frame insertion request is not pending, then the process moves to step S609.

If a frame insertion request is pending (based on signal 325), then the read pointer values are manipulated in step S605, as described above with respect to the examples shown in FIGS. 5A and 5B, and data is reorganized to a desired format in step S609.

In step S604, logic 306 analyzes and decodes a "next" data word to determine if a deletable character is present to comply with a deletion request. In step S606, the process determines if a frame deletion request is pending (based on signal 326). Steps S604 and S606 may occur simultaneously, and steps S603 and S604 may also occur simultaneously.

If a frame deletion request is not pending, then the process moves to step S609. If a frame deletion request is pending, then in step S608, read pointer values are manipulated to delete (or skip reading) a deletable character (for example, an IDLE character), as described above with respect to the examples shown in FIGS. 4A and 4B.

Thereafter, in step S610, reorganized data is transferred to receive path logic.

The foregoing illustration has been provided with respect to a HBA operating as a PCI-Express device in a SAN. The HBA and the SAN are intended to be an example of the aforementioned techniques/systems. The process/systems described can be used in any PCI-Express device where an input data stream at high speed will result in overflow/underflow conditions. Furthermore, the present invention is not limited to PCI-Express devices, any device coupled to a host computing system in a high throughput environment (for example, 4 Gb or 10 GB) can benefit from the adaptive aspects of the present invention, as described above.

In one aspect of the present invention, buffer under flow and overflow conditions are minimized by using at least two read pointers and by manipulating read pointer values to insert and delete characters.

Although the present invention has been described with reference to specific embodiments, these embodiments are illustrative only and not limiting. Many other applications and embodiments of the present invention will be apparent in light of this disclosure and the following claims.

What is claimed is:

1. A host bus adapter (HBA), comprising: a buffer memory in a receive path to receive data from a network; wherein the buffer memory includes a plurality of slots for temporarily storing the data; a write pointer logic configured to generate at least two write pointers to simultaneously write data in a first clock domain in at least two slots of the plurality of slots of the buffer memory; and a read pointer logic module configured to generate at least two read pointers to simultaneously read the data from the at least two slots of the buffer memory in a second clock do\-main; wherein when the at least two slots of the buffer memory are being read, a next data word stored at another slot of the buffer memory is analyzed to determine if a deletable character is to be deleted for a pending delete request and if the deletable character is to be deleted, instead of deleting the deletable character, a value for each of the at least two pointers is increased independently such that the deletable character is skipped, where the value for each of the at least two pointers is increased by a same value or by a different value depending on a relative location of the another slot with respect to the at least two slots; and wherein when the at least two slots of the buffer memory are being read, a current data word from each slot is analyzed to determine if any of the at least two slots include an insertable character for a pending insert request and if any of the at least two slots include the insertable character, then a value for each of the at least two pointers is increased independently such that the character is read more than once to comply with the pending insert request; where the value for each of the at least two pointers is increased by a same value or a different value depending on a location of the insertable character; wherein the at least two pointer values are increased by a default value unless there is the pending delete request or the pending insert request and then the at least two pointer values are increased by a non-default value is; and wherein the non-default value is different for the at least two of the read pointers.

2. The HBA of claim 1, wherein the buffer memory is located in a receive first-in-first-out logic module between a receive path logic module and a serial/deserializer interface; and the buffer memory operates as a first-in-first-out memory.

3. The HBA of claim 1, wherein a buffer memory read count module monitors the buffer memory to ascertain whether an underflow or an overflow condition will occur in the buffer memory while the data is being written and read from the buffer memory.

4. The HBA of claim 3, wherein the buffer memory read count module sends a buffer memory status count signal to the read pointer logic module indicating a current status for the buffer memory.

5. The HBA of claim 3, wherein the buffer memory read count module sends a delete request to the read pointer logic module to delete a character from the data.

6. The HBA of claim 1, wherein the deletable character is an IDLE character.

7. The HBA of claim 3, wherein the buffer memory read count module sends an insert request to the read pointer logic module to insert a character in the data.

8. The HBA of claim 1, wherein the data includes Fibre Channel frames received from a Fibre Channel device.

9. A device coupled to a host computing system for receiving data from a network, comprising: a buffer memory in a receive path to receive the data from the network; wherein the buffer memory includes a plurality of slots for temporarily storing the data; a write pointer logic configured to generate at least two write pointers to simultaneously write data in a first clock domain in at least two slots of the plurality of slots; and a read pointer logic module configured to generate at least two read pointers to simultaneously read the data from the at least two slots of the buffer memory in a second clock domain; wherein when the at least two slots of the buffer memory are being read, a next data word stored at another slot of the buffer memory is analyzed to determine if a deletable character is to be deleted for a pending delete request and if the deletable character is to be deleted, instead of deleting the deletable character, a value for each of the at least two pointers is increased independently such that the deletable character is skipped, where the value for each of the at least two pointers is increased by a same value or by a different value depending on a relative location of the another slot with respect to the at least two slots; and wherein when the at least two slots of the buffer memory are being read, a current data word from each slot is analyzed to determine if any of the at least two slots include an insertable character for a pending insert request and if any of the at least two slots include the insertable character, then a value for each of the at least two pointers is increased independently such that the character is read more than once to comply with the pending insert request; where the value for each of the at least two pointers is increased by a same value or a different value depending on a location of the insertable character; wherein the at least two pointer values are increased by a default value unless there is the pending delete request or the pending insert request and then the at least two pointer values are increased by a non-default value is; and wherein the non-default value is different for the at least two of the read pointers.

10. The device of claim 9, wherein the buffer memory is located in a receive first-in-first-out logic module between a receive path logic module and a serial/de-serializer interface and operates as a first-in-first-out memory.

11. The device of claim 9, wherein a buffer memory read count module monitors the buffer memory to ascertain whether an underflow or overflow condition will occur in the buffer memory while the data is being written and read from the buffer memory.

12. The device of claim 11, wherein the buffer memory read count module sends a buffer memory status count to the read pointer logic module indicating a current status for the buffer memory.

13. The device of claim 12, wherein the buffer memory read count module sends a delete request to the read pointer logic module to delete a character from the data.

14. The device of claim 9, wherein the data includes Fibre Channel frames received from a Fibre Channel device.

15. The device of claim 11, wherein the buffer memory read count module sends an insert request to the read pointer logic module to insert a character in the data.

16. The device of claim 9, wherein the insertable character is an IDLE character.

17. A method for processing data received by an adapter from a network, comprising: (a) receiving the data in a buffer memory with a plurality of slots; wherein the buffer memory is located in a receive path of the adapter; (b) reading at least two data words simultaneously from two of the slots of the buffer memory based on at least two read pointer values; wherein a read pointer logic generates the at least two read pointer values to read consecutive data words from the buffer memory; (c) analyzing a next data word while a current word is being read from the two slots to comply with a delete request that is received from a read count module; (d) analyzing a current word that is read from the two slots to comply with an insert request from the read pointer logic; (e) increasing the at least two read pointer values so that a character is skipped to comply with the delete request; wherein a value by which each of the at least two pointers are increased are same or different depending on a relative location of a slot that stores a deletable character with respect to the two slots; and (f) increasing the at least two read pointer values independently so that the character is read more than once to comply with the insert request; wherein a value for each of the at least two pointers is increased by a same value or a different value de\-pending on a location of a slot storing an insertable character; wherein the at least two pointer values are increased by a default value unless there is the pending delete request or the pending insert request and then the at least two pointer values are increased by a non-default value is; and wherein the non-default value is different for the at least two of the read pointers.

18. The method of claim 17, wherein the read count module sends the insert request and the delete request to the read pointer logic to avoid under flow and over flow conditions in the buffer memory.

19. The method of claim 17, wherein the buffer memory is written in a first clock domain and read in a second clock domain.

20. The HBA of claim 1, further includes, a next fill word analyzer and decoder logic that analyzes data that would be read next and generates a signal to the read pointer logic to skip reading the next data, if the next data is to be skipped; and the read pointer logic increases the at least two read pointers based upon the signal from the next fill word analyzer and decoder logic so as to skip the next data that is to be read.

21. The HBA of claim 1, further includes, a current fill word analyzer and decoder logic that analyzes the data read from the slot pointed by each of the at least two read pointers and generates a signal to the read pointer logic to indicate whether the slot pointed by each of the at least two read pointers should be re-read; and the read pointer logic adjusts the at least two read pointers based upon the signal from the current fill word analyzer and decoder logic so as to re-read the slots pointed by one or both of the at least two read pointers.

22. The device of claim 9, further includes, a next fill word analyzer and decoder logic that analyzes data that would be read next and generates a signal to the read pointer logic to skip reading the next data, if the next data is to be skipped; and the read pointer logic adjusts the at least two read pointers based upon the signal from the next fill word analyzer and decoder logic so as to skip the next data to be read.

23. The device of claim 9, further includes, a current fill word analyzer and decoder logic that analyzes the data read from the slot pointed by each of the at least two read pointers and generates a signal to the read pointer logic to indicate whether the slot pointed by each of the at least two read pointers should be re-read; and the read pointer logic adjusts the at least two read pointers based upon the signal from the current fill word analyzer and decoder logic so as to re-read the slots pointed by one or both of the at least two read pointers.

* * * * *

UNITED STATES PATENT AND TRADEMARK OFFICE
CERTIFICATE OF CORRECTION

PATENT NO.        : 7,802,031 B2
APPLICATION NO.   : 11/132020
DATED             : September 21, 2010
INVENTOR(S)       : David T. Kwak et al.

It is certified that error appears in the above-identified patent and that said Letters Patent is hereby corrected as shown below:

In column 2, line 56, delete "ream" and insert -- stream --, therefor.

In column 8, line 42, delete "RP'." and insert -- RP0'. --, therefor.

In column 9, line 45, in claim 1, delete "do\-main;" and insert -- domain; --, therefor.

In column 10, line 2, in claim 1, delete "value is;" and insert -- value; --, therefor.

In column 10, line 61-62, in claim 9, delete "value is;" and insert -- value; --, therefor.

In column 11, line 42, in claim 17, delete "de\-pending" and insert -- depending --, therefor.

In column 11, line 46, in claim 17, delete "value is," and insert -- value; --, therefor.

Signed and Sealed this
Twenty-eighth Day of December, 2010

David J. Kappos
*Director of the United States Patent and Trademark Office*